United States Patent [19]
Carrara

[11] Patent Number: 5,167,141
[45] Date of Patent: Dec. 1, 1992

[54] SEAL WITHDRAWAL AND TESTING DEVICE

[75] Inventor: Mauro Carrara, Viggiu', Italy

[73] Assignee: RFT S.p.A., Turin, Italy

[21] Appl. No.: 664,322

[22] Filed: Mar. 4, 1991

[30] Foreign Application Priority Data

Mar. 6, 1990 [IT] Italy ............... 67155 A/90

[51] Int. Cl.⁵ ............................................. G01M 3/26
[52] U.S. Cl. ..................................... 73/45.3; 209/591
[58] Field of Search ................... 73/45.3, 45.1, 37; 209/591, 643, 905

[56] References Cited

U.S. PATENT DOCUMENTS

| | | | |
|---|---|---|---|
| 3,015,388 | 1/1962 | Wilckens | 73/45.3 X |
| 3,126,734 | 3/1964 | Stutzman | 73/45.3 X |
| 3,318,137 | 5/1967 | Denlinger et al. | 73/45.3 |
| 3,360,983 | 1/1968 | Smith | 73/45.3 |
| 3,374,887 | 3/1968 | Paruolo et al. | 73/45.1 X |

FOREIGN PATENT DOCUMENTS 12765 1/1980 Japan .......................... 209/591

Primary Examiner—Hezron E. Williams
Assistant Examiner—Joseph W. Roskos
Attorney, Agent, or Firm—Ladas & Parry

[57] ABSTRACT

A device for testing and withdrawing seals from manufacturing molds, which device consists of a pneumatic pickup member having a front impression connected to a pneumatic line in turn connected to a vacuum source, and defined by opposite edges designed to cooperate with respective peripheral sealing portions of each seal; the pneumatic line presenting a transducer for emitting a signal when the difference in the pressures detected on the line over a predetermined time interval exceeds a predetermined threshold value.

5 Claims, 2 Drawing Sheets

SEAL WITHDRAWAL AND TESTING DEVICE

BACKGROUND OF THE INVENTION

The present invention relates to a device for simultaneously withdrawing and testing seals, in particular, the airtight rubber/metal shields commonly employed on rolling bearings. More generally speaking, the present invention relates to a system for testing the sealing capacity of seals.

Seals, particularly the composite airtight shields commonly employed on rolling bearings and featuring an elastomeric sealing portion and a rigid reinforcing insert, are normally injection or, preferably, compression or transfer molded in molds having one or more impressions, each designed to produce one seal. The seals are then removed from the molds, usually by means of mechanical, magnetic or vacuum-operated pickup members, and, prior to use, are tested for defects and to ensure pollutant sealing efficiency.

SUMMARY OF THE INVENTION

The aim of the present invention is to provide a device enabling rapid, efficient testing of the seals, during or after withdrawn from the mold, thus enabling the test device to be installed directly on the production line for on-line rejection of any faulty seals immediately after molding.

With this aim in view, according to the present invention, there is provided a device for testing seals, in particular airtight shields used on bearings or similar, characterised by the fact that it comprises a head having a front impression the edges of which are designed to cooperate with respective opposite peripheral elastomeric sealing portions of the seal; the inside of said impression being connected directly to a pneumatic line in urn connected to a vacuum source; and said pneumatic line presenting means for detecting the pressure in said line and generating a signal under predetermined pressure conditions.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
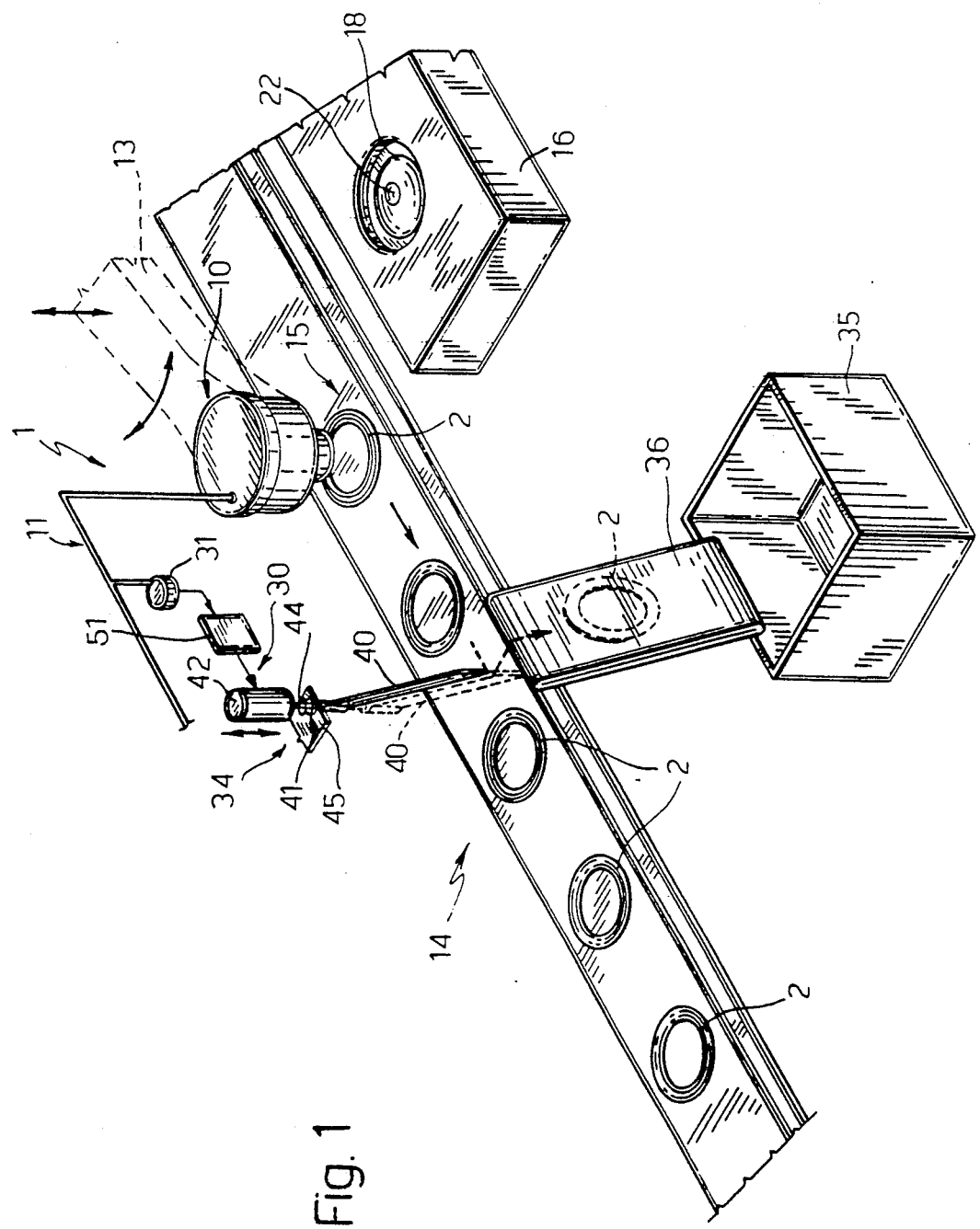
FIG. 1 shows a schematic view in perspective of a device in accordance with the present invention.
Figure 2:
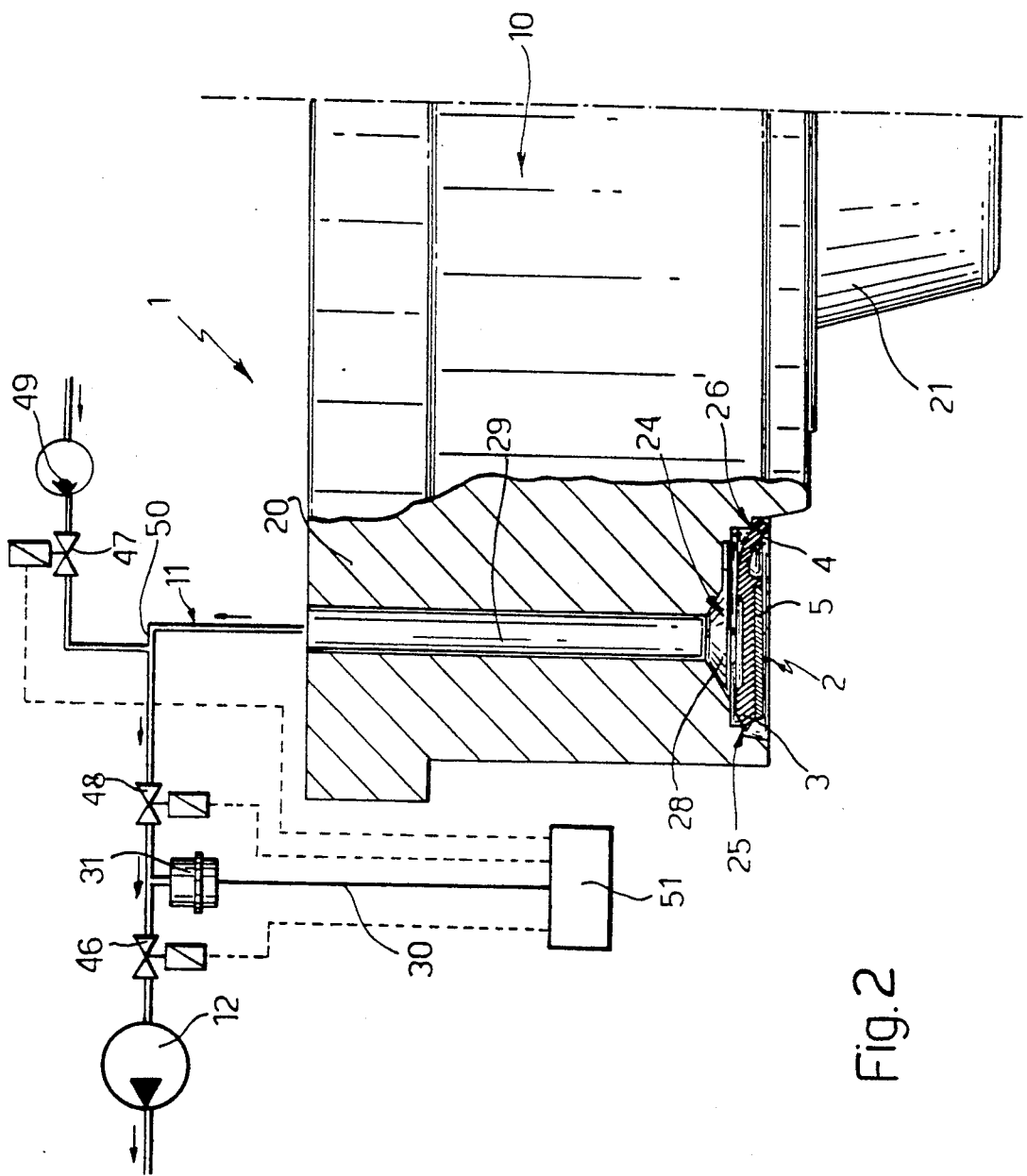
FIG. 2 shows a partially sectioned, larger-scale view of the main components, some shown schematically, of a device in accordance with the present invention.

Number 1 in FIGS. 1 and 2 indicates a pneumatic device designed, according to the preferred embodiment shown of the present invention, to simultaneously withdraw and test a seal 2 of any known type comprising opposite peripheral sealing portions 3, 4 of elastomeric material (FIG. 2). In particular, the seals 2 handled by device 1 are those used as airtight shields on rolling bearings, which may or may not feature a rigid reinforcing insert 5 molded in one piece with the seal. More generally speaking, however, device 1 provides for handling and/or testing any type of seal having peripheral sealing portions similar to 3 and 4, regardless of whether or not they are annular and/or defined by flexible lips. According to the non-limiting example shown, device 1 substantially comprises a substantially known pneumatic pickup member 10 connected by a known pneumatic line 11 to a vacuum source consisting, for example, of a vacuum pump 12; and means, for example, an arm 13 designed to swing in the direction of the arrows and forming part, for example, of a servomechanism or known robot handling device (not shown), for selectively positioning pickup member 10 in at least two predetermined positions. Test device 1 preferably also comprises a known conveyor 14, for example, a belt conveyor, in which case, said two predetermined positions into which pickup member 10 is moved selectively by arm 13 consist of that occupied by portion 15 of conveyor 14 and that occupied, for example, by a mold 16 for forming seal 2. In FIG. 1, mold 16 is shown in the open position, and presents an impression 18 inside which, when mod 16 is closed, seal 2 is injection, compression or transfer molded.

According to the present invention, pickup member 10 substantially comprises a head 20 designed to engage mold 16 in known manner and coaxially with impression 18 which is substantially annular. Head 20 is supported on arm 13, which in addition to swinging is also designed to move up and down vertically in the direction of the arrows (FIG. 1), and presents an axial truncated-cone-shaped front protection 21 designed to engage with a respective truncated-cone-shaped cavity 22 on mold 16 for automatically centering head 20 inside open mold 16, over impression 18 housing the seal to be picked up. For this purpose, head 20 also presents, coaxially with projection 21, a front impression 24 having the same contour as impression 18 and which, when head 20 engages mold 16, is arranged facing impression 18, and is so shaped as to at east partially house seal 2. In particular, impression 24 comprises opposite, preferably stepped edges 25 and 26 designed to mate with respective opposite peripheral sealing portions 3 and 4 of seal 2, so as to cooperate in substantially fluidtight manner with the same.

Beyond the mouth defined by edges 25 and 26, the inside of impression 24 constitutes a cavity 28 connected directly to pneumatic line 11, for example, via a hole 29 formed inside head 20. According to the present invention, pneumatic line 11 presents means for detecting the pressure in line 11 and emitting a signal, in particular an electric signal over electric line 30, when predetermined pressure conditions are detected. In particular, said detecting means comprise a transducer 31 connected hydraulically to line 11 between two valves 46 and 48 series-connected to line 11 up- and downstream from transducer 31. As such, valve 46 provides for isolating transducer 31 and line 11 from vacuum source 12, and valve 48 for isolating transducer 31 and, consequently also vacuum source 12, from an upstream branch 50 of line 11 adjacent to hole 29. Preferably, branch 50 may also be selectively connected to a compressor (or any other air pressure source) 49 via a further valve 47 connected upstream from valve 48 (in relation to the position of hole 29). Valves 46, 47 and 48 are all controlled electromagnetically, and valves 47 and 48 are so controlled that, when valve 47 is open, valve 48 is closed and vice versa. For example, valves 46, 47 and 48 are all controlled by a control system 51 to which transducer 31 is also connected over line 30. Control system 51 (FIG. 1) is also connected to the activating means of a known deflecting device 34 on conveyor 14, for feeding any defective seals 2 into a reject bin, in the example shown, a bin 35 located for example at the end of a chute 36 to the side of conveyor 14.

Deflector 34 is located immediately downstream from portion 15 and, as described, is controlled via control system 51 by said means for detecting the pressure in pneumatic line 11. In the example shown, deflector 34 comprises a vertically mobile plate 40 arranged obliquely across conveyor 14 next to reject bin 35. Plate 40 may normally be maintained in the raised position over conveyor 14 (as shown by the continuous line in FIG. 1) by means of a spring 41, and be lowered on to conveyor 14, by an electromagnetic actuator 42 and in opposition to spring 41, into the position shown by the dotted line in FIG. 1, wherein plate 40 interferes with the path of seals 2 travelling on conveyor 14. Spring 41, actuator 42 and plate 40, which is connected to actuator 42 by a rod 44, are supported in known manner on a bracket 45.

Device 1 as described operates as follows. As they are formed inside mold 16, seals 2 are picked up by head 20 and, via mobile arm 13, are unloaded one at a time on to portion 15 of conveyor 14 by which they are fed forward in the direction of the arrow in FIG. 1. After a number of pickup and unloading operations, conveyor 14 presents a number of roughly equally spaced seals 2 travelling at the same speed towards the end of conveyor 14 (not shown) where provision is made, for example, for a finished port bin. Seals 2 are picked up and unloaded pneumatically on to conveyor 14 by head 20 with the aid of a known mechanical extractor (not shown) on mold 16. When mold 16 is open, seal 2 is housed inside impression 18. Arm 13, controlled appropriately in known manner, moves head 20 over and on to mold 16, so as to engage projection 21 inside cavity 22 with impression 24 exactly facing impression 18. In this position, edges 25 and 26 are also substantially arranged contacting peripheral sealing portions 3 and 4 of seal 2. valve 47 is closed, and valves 46 and 48 are open. At this point, vacuum pump 12 extracts the air inside cavity 28, which is prevented from receiving more than a minimum quantity of outside air by virtue of the vacuum formed inside impression 24 causing edges 25 and 26 to contact portions 3 and 4. Seal 2 is thus "sucked" on to head 20 and, on being expelled from impression 18 by said known extractor, is removed from mold 16 along with head 20. At this point, valve 46 is closed, and the vacuum inside cavity 28 is maintained, thus retaining seal 2 on head 20, until this is moved over to conveyor 14. Finally, valve 47 is opened and valve 48 closed, so as not only to eliminate the vacuum in cavity 28 but also to allow pressurized air to be fed into cavity 28 by compressor 49, thus causing seal 2 to drop on to portion 15 of conveyor 14. By this time, a further seal 2 has been formed in mold 16, and the pickup/unloading cycle is repeated so as to unload all of seals 2 on to conveyor 14 as they are formed.

During the transfer stage, i.e. between pickup and release of seal 2, while this is retained by atmospheric pressure on edges 25 and 26 of impression 24, valves 46 and 47 are closed and valve 48 open. Seal 2 may thus be tested fairly easily, the purpose of the test substantially being to determine the workable condition of sealing portions 3 and 4, or whether these present molding defects. According to the present invention, said test consists in detecting the pressure (vacuum) present in line 11 within a predetermined time interval. If portions 3 and 4 are sound, the initial vacuum when seal 2 is picked up will cause them to cooperate in fluidtight manner with edges 25 and 26, so that no outside air will be allowed to enter cavity 28, or at least such a small amount that the vacuum in cavity 28 and line 11 will fall very slowly. If, on the other hand, portions 3 and 4 are not sound, outside air will enter into cavity 28 and, as vacuum pump 12 is by now isolated by valve 46, the pressure in line 11 will rise (i.e. the vacuum will fall) considerably, even if not sufficiently to detach seal 2 from head 20 during transfer. Control system 51 is therefore programmed to take two readings of the pressure value in line 11 indicated continuously by transducer 31, one at the start and one at the end of a predetermined time interval, e.g. a few tenths of a second, depending on the sensitivity of transducer 31. The two readings are then compared and the difference between them calculated by control system 51. If the difference is below a given threshold value memorised in control system 51, this means little or no outside air has entered cavity 28, i.e. that seal 2 is sound. If, on the other hand, the difference between the pressures detected at the start and end of the time interval is above said given threshold, this means outside air has entered cavity 28, i.e. that seal 2 is defective. In the former case, control system 51 does not activate deflector 34, plate 40 stays up, and seal 2 on head 20 is released on to portion 15 and allowed to continue along conveyor 14 past deflector 34. In the latter case, on the other hand, control system 51 activates deflector 34, plate 40 is lowered and, on being released on to portion 15, the faulty seal 2 is deflected by plate 40, as shown by the dotted line in FIG. 1, into bin 35.

The advantages of the present invention will be clear from the foregoing description. By simply providing a transducer on the pneumatic line governing a vacuum pickup member, and designing the latter so as to engage with the seal portions for testing, the seals being produced can be tested as they are withdrawn from the molds, thus providing for substantial advantages in terms of operation. To those skilled in the art it will be clear that changes may be made to the device described and illustrated herein without, however, departing from the scope of the present invention. For example, assuming multiple molds are employed, a number of seals may be tested simultaneously by simply using a head with a number of impressions, each having its own exhaust line and respective transducer. It is also possible for the handling and test functions to be performed by two separate devices. For example, seals 2 may be picked up and transferred by a known pneumatic, magnetic or mechanical handling device, with a stationary head 20 used exclusively for testing. In this case, after withdrawing seals 2 from mold 16 and before releasing them on to conveyor 14, the handling device will load them on to head 20 located, for example, on the opposite side of conveyor 14 to mold 16. Once loaded on to a respective impression 24, seals 2 may be tested as described, by extracting the air from cavity 28 and measuring any variation in the vacuum in line 11 over a predetermined time interval.

I claim:

1. A device for testing seals, in particular airtight shields used on bearings comprising a head having a front impression with edges that are designed to cooperate with opposite peripheral elastomeric sealing portions of each seal; a pneumatic line having one end thereof connected to the head and in fluid communication with the interior of said impression and at an other end said pneumatic line being connected to a vacuum source; a transducer designed for continuously detecting the pressure in said line; valve means for selectively interrupting the air flow between said line and said vacuum source; and control means for comparing pressure readings detected by the transducer during a predetermined interval of time when the air flow is interrupted, and then generating a signal when the difference between said readings overcome a predetermined threshold value.

2. A device as claimed in claim 1, wherein said head forms part of a pneumatic pickup member connected by said pneumatic line to said vacuum source and supported on means for selectively positioning said pickup member in at least two predetermined positions.

3. A device as claimed in claim 2, further comprising a conveying device, one portion of which is located in one of said predetermined positions, thus enabling said handling member to unload said seal on to said conveying device; said conveying device presenting a deflector for feeding rejects into a collecting bin, said deflector being connected electrically to and activated by said signal provided by said controlling means.

4. A device as claimed in claim 3, wherein said deflector comprises a vertically mobile plate arranged obliquely across said conveyor and next to a collecting bin to the side of said conveyor.

5. A device as claimed in claim 1, further comprising seal rejecting means controlled by said controlling means; said controlling means being designed to activate said seal rejecting means when said difference in pressure at the start and end of said predetermined time interval exceeds a predetermined threshold value.

* * * * *